(12) United States Patent
Embrechts et al.

(10) Patent No.: US 12,525,055 B2
(45) Date of Patent: Jan. 13, 2026

(54) METHOD, APPARATUS AND COMPUTER PROGRAM FOR AUTHENTICATING A USER

(71) Applicant: Sony Group Corporation, Tokyo (JP)

(72) Inventors: Hugo Embrechts, Stuttgart (DE); Gonzalo Bailador, Stuttgart (DE); Dimitri Torfs, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 503 days.

(21) Appl. No.: 17/617,597

(22) PCT Filed: Jun. 17, 2020

(86) PCT No.: PCT/EP2020/066696
§ 371 (c)(1),
(2) Date: Dec. 9, 2021

(87) PCT Pub. No.: WO2020/260086
PCT Pub. Date: Dec. 30, 2020

(65) Prior Publication Data
US 2022/0245963 A1 Aug. 4, 2022

(30) Foreign Application Priority Data
Jun. 28, 2019 (EP) .................................... 19183117

(51) Int. Cl.
G06V 40/16 (2022.01)
G06F 21/32 (2013.01)
G06V 40/20 (2022.01)

(52) U.S. Cl.
CPC ............ *G06V 40/172* (2022.01); *G06F 21/32* (2013.01); *G06V 40/20* (2022.01)

(58) Field of Classification Search
CPC ...... G06V 40/172; G06V 40/20; G06V 40/10; G06V 40/16; G06F 21/32; G06F 21/31
See application file for complete search history.

(56) References Cited

U.S. PATENT DOCUMENTS 8,970,348 B1 * 3/2015 Evans .................... G06F 21/32
340/5.83
9,082,235 B2 7/2015 Lau et al.
(Continued)

FOREIGN PATENT DOCUMENTS

WO 2018/154342 A1 8/2018

OTHER PUBLICATIONS

International Search Report and Written Opinion mailed on Sep. 22, 2020, received for PCT Application PCT/EP2020/066696, Filed on Jun. 17, 2020, 10 pages.
(Continued)

*Primary Examiner* — Jennifer Mehmood
*Assistant Examiner* — Dustin Bilodeau
(74) *Attorney, Agent, or Firm* — XSENSUS LLP

(57) ABSTRACT

Examples relate to a method, an apparatus and a computer program for authenticating a user. The method comprises prompting the user to perform a facial gesture. The method comprises recording a facial gesture performed by the user using a visual sensor. The method comprises comparing micro-movements of the user's facial features during the recorded facial gesture with a user-specific reference sample of micro-movements for a specific facial gesture. The method comprises authenticating the user based on a match between the micro-movements of the user's facial features during the recorded facial gesture and the user-specific reference sample of micro-movements for the specific facial gesture.

14 Claims, 2 Drawing Sheets

(56) References Cited

U.S. PATENT DOCUMENTS

| | | |
|---|---|---|
| 10,049,287 B2 | 8/2018 | Holz et al. |
| 2016/0057138 A1* | 2/2016 | Hoyos .................. G06V 40/168 |
| | | 726/7 |
| 2016/0085952 A1 | 3/2016 | Chatterton |
| 2016/0342851 A1* | 11/2016 | Holz ...................... G06V 40/70 |
| 2018/0307815 A1* | 10/2018 | Samadani .............. G06V 40/45 |
| 2019/0197224 A1* | 6/2019 | Smits .................... G06V 40/176 |
| 2020/0393908 A1* | 12/2020 | Kejariwal ............. G06V 40/167 |

OTHER PUBLICATIONS

Bharadwaj et al., "Computationally Efficient Face Spoofing Detection with Motion Magnification", IEEE Conference on Computer Vision and Pattern Recognition Workshops, 2013, pp. 105-110.

* cited by examiner

METHOD, APPARATUS AND COMPUTER PROGRAM FOR AUTHENTICATING A USER

CROSS-REFERENCE TO RELATED APPLICATIONS

The present application is based on PCT filing PCT/EP2020/066696, filed Jun. 17, 2020, which claims priority to EP 19183117.1, filed Jun. 28, 2019, the entire contents of each are incorporated herein by reference.

FIELD

Examples relate to a method, an apparatus and a computer program for authenticating a user, more specifically, but not exclusively, to a method, an apparatus and a computer program for authenticating a user using micro-movements of the user's facial features that are recorded after the user is prompted to perform a gesture.

BACKGROUND

The authentication of users is a field of research and development. As more and more personal information is stored on electronic devices, protected by user authentication, and more and more services require a user to be authenticated, techniques for the authentication of users are required that are easy and seamless to use while providing adequate security. For example, in many devices, biometric authentication mechanisms, such as fingerprint sensing, handprint sensing, iris scanning or facial recognition are being used to provide a seamless yet (mostly) secure form of authentication. As such biometric authentication mechanisms offer a high reward to an attacker: In many cases, biometric features are immutable, i.e. they persist and cannot be changed (as opposed to passwords), they are under constant attack, e.g. by creating masks, casts or by using high-quality images of the biometric features. Accordingly, there may be a desire to provide a biometric authentication mechanism that provides an improved resistance towards attacks.

SUMMARY

This desire is addressed by the subject of the independent claims.

Examples of the present disclosure are based on the finding that, in addition to or instead of facial recognition, a recognition of facial micro-movements may be performed that occur when a user is prompted to perform a facial gesture. During the performance of the facial gesture, a multitude of facial muscles are triggered, leading to miniscule movements of the muscles (i.e. the facial micro-movements). Facial micro-movements are user-specific: Each user performs the micro-movements of a specific facial gesture in a unique way, which enables using the micro-movements for authentication. By prompting the user to perform a gesture (i.e. a gesture for which a user-specific reference sample of micro-movements is available), recording the facial gesture and comparing the facial gesture to a user-specific reference sample, the user may be authenticated.

Examples of the present disclosure provide a method for authenticating a user. The method comprises prompting the user to perform a facial gesture. The method comprises recording a facial gesture performed by the user using a visual sensor. The method comprises comparing micro-movements of the user's facial features during the recorded facial gesture with a user-specific reference sample of micro-movements for a specific facial gesture. The method comprises authenticating the user based on a match between the micro-movements of the user's facial features during the recorded facial gesture and the user-specific reference sample of micro-movements for the specific facial gesture.

Examples of the present disclosure further provide a computer program having a program code for performing a method for authenticating a user, when the computer program is executed on a computer, a processor, or a programmable hardware component. The method comprises prompting the user to perform a facial gesture. The method comprises recording a facial gesture performed by the user using a visual sensor. The method comprises comparing micro-movements of the user's facial features during the recorded facial gesture with a user-specific reference sample of micro-movements for a specific facial gesture. The method comprises authenticating the user based on a match between the micro-movements of the user's facial features during the recorded facial gesture and the user-specific reference sample of micro-movements for the specific facial gesture.

Examples of the present disclosure further provide an apparatus for authenticating a user. The apparatus comprises a user interface for providing information to the user. The apparatus comprises a visual sensor for recording a face of the user. The apparatus comprises processing circuitry configured to prompt the user to perform a facial gesture via the user interface. The processing circuitry is configured to record a facial gesture performed by the user using the visual sensor. The processing circuitry is configured to compare micro-movements of the user's facial features during the recorded facial gesture with a user-specific reference sample of micro-movements for a specific facial gesture. The processing circuitry is configured to authenticate the user based on a match between the micro-movements of the user's facial features during the recorded facial gesture and the user-specific reference sample of micro-movements for the specific facial gesture.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
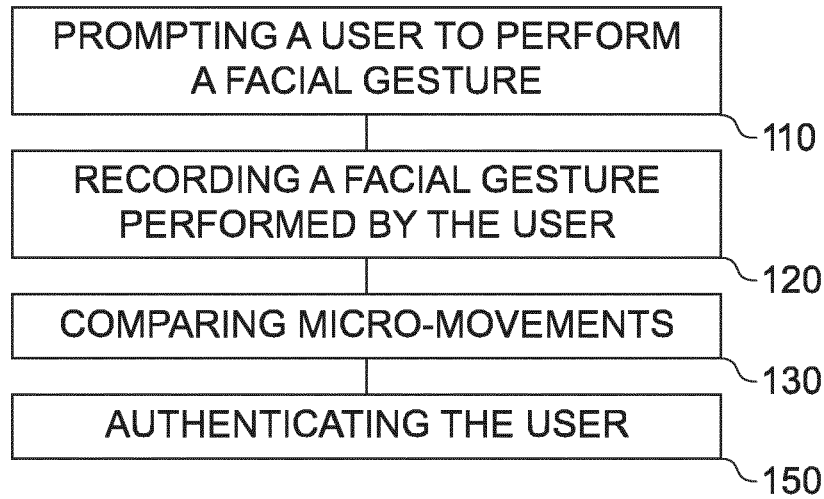
FIGS. 1a and 1b show flow charts of embodiments of a method for authenticating a user.
Figure 1B:
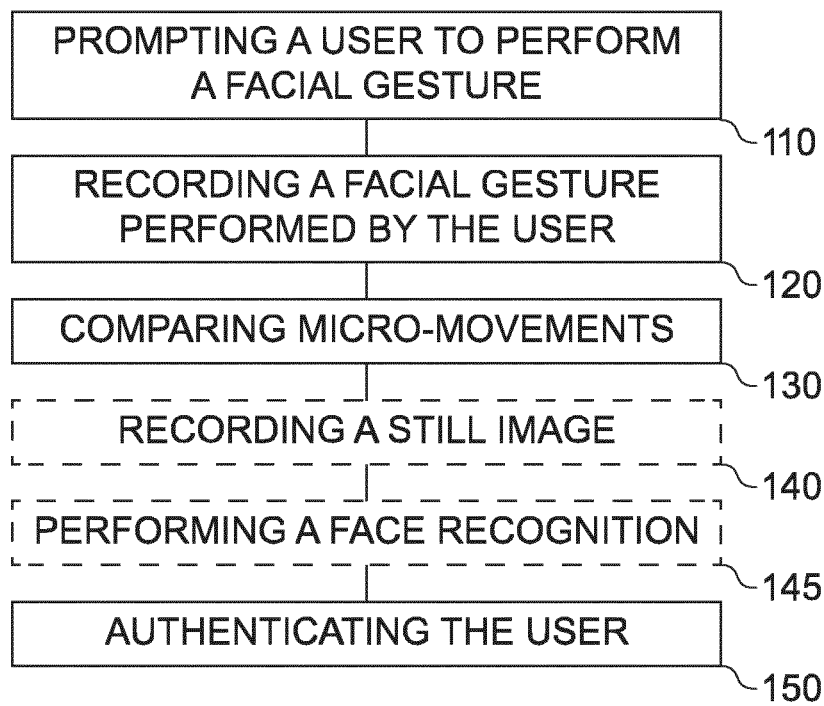

FIGS. 1a and 1b show flow charts of embodiments of a method for authenticating a user. The method comprises prompting 110 the user to perform a facial gesture. The method comprises recording 120 a facial gesture performed by the user using a visual sensor. The method comprises comparing 130 micro-movements of the user's facial features during the recorded facial gesture with a user-specific reference sample of micro-movements for a specific facial gesture. The method comprises authenticating 150 the user based on a match between the micro-movements of the user's facial features during the recorded facial gesture and the user-specific reference sample of micro-movements for the specific facial gesture. For example, the method may be performed by a (single) device, such as a mobile device, a smartphone, a tablet computer, a wearable device, a television, a video game console, a computer, a laptop computer, a desktop computer, a home security system or an automated teller machine (ATM).

Figure 1C:
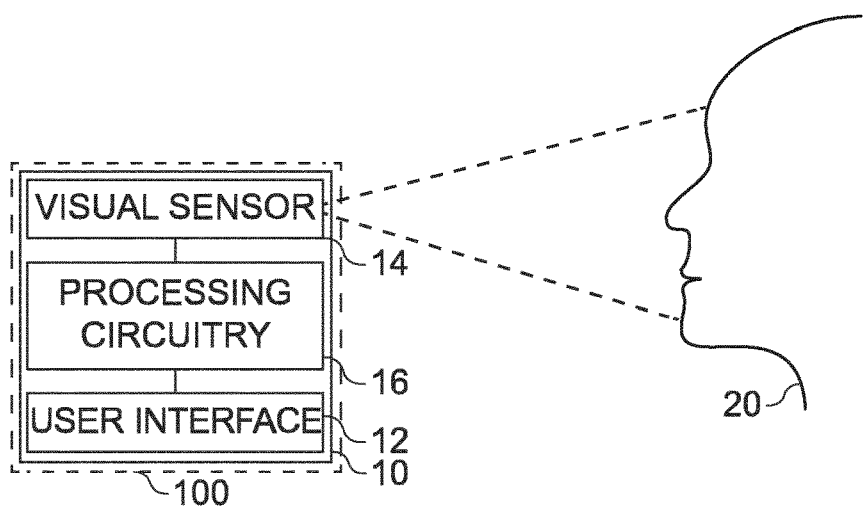
FIG. 1c shows a block diagram of an apparatus for authenticating a user.

FIG. 1c shows a block diagram of an apparatus 10 for authenticating a user. The apparatus 10 comprises a user interface 12 for providing information to the user. The apparatus 10 comprises a visual sensor 14 for recording a face of the user. The apparatus 10 comprises processing circuitry 16 that is coupled to the user interface 12 and to the visual sensor 14. The processing circuitry 16 may be configured to execute the method of FIGS. 1a and/or 1b, e.g. in conjunction with the user interface 12 and/or the visual sensor 14. For example, the processing circuitry 16 is configured to prompt the user to perform a facial gesture via the user interface 12. The processing circuitry 16 is configured to record a facial gesture performed by the user using the visual sensor 14. The processing circuitry 16 is configured to compare micro-movements of the user's facial features during the recorded facial gesture with a user-specific reference sample of micro-movements for a specific facial gesture. The processing circuitry 16 is configured to authenticate the user based on a match between the micro-movements of the user's facial features during the recorded facial gesture and the user-specific reference sample of micro-movements for the specific facial gesture. FIG. 1c further shows a device 100 comprising the apparatus 10. For example, the device 100 may be one a mobile device, a smartphone, a tablet computer, a wearable device, a television, a video game console, a computer, a laptop computer, a desktop computer, a home security system and an automated teller machine.

Examples of the present disclosure relate to an apparatus, a method and a computer program for authenticating a user. In this context, the authentication of the user is the act of confirming that the user that is attempting to authenticate is in fact the user he or she is claiming to be. For example, in case of a mobile device, such as a smartphone, a single user may be authorized to use the mobile device. The authentication of the user towards the mobile device may be the act of confirming that the user that is trying to access the mobile device is in fact the user that is authorized to access the mobile device. In another example, the device may be an ATM, and the user may try to withdraw money from a bank account. The authentication of the user towards the ATM may be the act of confirming that the user that is trying to withdraw money is in fact the user that is authorized to withdraw money from the bank account. To sum it up, authenticating a user may correspond to conforming that the user being authenticated is who he or she claims to be (e.g. a user that is authorized to use a mobile device or a user that is authorized to withdraw money from a specific bank account).

As indicated above, the authentication of the user may be used for different purposes. For example, the user may be authenticated 150 towards a device, e.g. to enable the user to use the device. The device may be one of a mobile device, a smartphone, a tablet computer, a wearable device, a television, a video game console, a computer, a laptop computer, a desktop computer, a home security system and an automated teller machine. Additionally or alternatively, the user may be authenticated 150 to authorize a financial transaction, such as a credit card transaction, debit card transaction or money withdrawal.

The method comprises prompting 110 the user to perform a facial gesture. For example, the user may be prompted to perform the facial gesture using a user interface (e.g. the user interface 12). For example, the user interface may be a visual user interface, e.g. the user interface may be or may comprise a display, such as a touch-screen display, and the prompt may be displayed on the display. Alternatively, the user interface may be an audio user interface, e.g. the user interface may comprise a speaker, a headphone jack or headphones, and the prompt may be output as audio prompt. For example, the audio prompt may be an indicator sound that the user associates with performing facial gestures. Alternatively, the audio prompt may be a spoken request (e.g. pre-recorded or generated using text-to-voice technology) prompting the user to perform a facial gesture.

In some embodiments, the user is prompted to perform a specific facial gesture. This prompt may be explicit, e.g. by describing the facial gesture. For example, the facial gesture may be described by providing a label of the specific facial gesture (e.g. "smile", "shrug", "raised eyebrows", "grumpy face"). In other words, the user may be prompted 110 to perform the gesture by providing a description of the specific facial gesture. Alternatively, the prompt may be implicit, e.g. by specifying a service that the authentication is to be used for. For example, a plurality of predefined user-specific facial gestures may be used for authentication. Each gesture of the plurality of predefined user-specific facial gestures may be associated with a service, e.g. with a single service. Each service may be associated with a (single) gesture of the plurality of predefined user-specific facial gestures, i.e. there may be a 1-to-1 relationship between a service and the specific facial gesture that may be used to authenticate the user for using the service. In this case, the implicit prompt to perform the specific facial gesture may comprise describing the service, e.g. without also describing the specific facial gesture. In this case, the user is prompted 110 to perform the gesture by providing an indication of the service. Accordingly, the authentication 150 may be based on the user's knowledge of which specific facial gesture to use for the service (e.g. without providing a description of the associated gesture). The knowledge of which specific facial gesture to use for the service may be used as a second factor in the authentication of the user (the first factor being the match between the micro-movements of the user's facial features during the recorded facial gesture and the user-specific reference sample). In any case, the specific facial gesture may be a "posed" facial gesture, such as a posed smile, i.e. a facial gesture that is to be performed by a user in response to the prompt, and not a facial gesture that is naturally performed by the user without prompting.

In more general terms, the authentication 150 may be based on the user's knowledge of which specific facial gesture to use for the authentication (as a second factor). In this case, the user may be prompted to perform the gesture without describing the specific facial gesture, e.g. by prompting the user to perform a gesture in a generic way, without providing additional details, to leverage the knowledge of which specific facial gesture to use for the authentication. In other words, the user may be prompted to perform an unspecified facial gesture. For example the user may select a gesture out of a plurality of gestures (that is, without a specific prompting or indication).

In some embodiments, the authentication of the user may be based on any gesture for which a user-specific reference sample is available, e.g. without requiring prior knowledge of which gesture to use to authenticate. For example, the user may be prompted to perform an unspecific facial gesture, or to select a gesture out of a plurality of gestures, of which any may be user for authentication. In other words, a plurality of user-specific reference samples for a plurality of different gestures may be available. The user may select (or be prompted to perform) one (or even several in a row, to increase security) of the plurality of different gestures. Such a form of authentication be used in addition to a situation where knowledge of acceptable facial gestures is used as a second factor for authentication, or alone (that is, with explicit prompting). In other words, the user may be prompted twice to perform a gesture: Once, the authentication may be based on the user's knowledge of which specific facial gesture to use for the authentication, and once, the authentication may be based on one or several of the plurality of different gestures. Alternatively, the authentication might be based on one or several of the plurality of different gestures, without requiring an authentication that is based on the knowledge of which gesture to use for authenticating.

The method comprises recording 120 the facial gesture performed by the user using the visual sensor. For example, the recording may comprise multiple frames of image data, e.g. having a frame rate of at least 24 frames/s. As micro-movements can be determined by comparing multiple frames of the face, tracking the micro-movements over the frames, the visual sensor may be any visual sensor capable of providing multiple frames. Recording 120 the facial gesture may comprise recording a plurality of image frames while the user performs the facial gesture, i.e. a video of the face of the user while the user performs the facial gesture. In some embodiments, the frame rate of the recording may be between 20 frames/s and 30 frames/s. Accordingly, the facil gesture may be recorded 120 with a frame rate between 20 frames per second and 30 frames per second. Alternatively, higher frame rates may be used, e.g. by using a high-speed camera sensor or a slow-motion camera sensor. Accordingly, the facial gesture may be recorded 120 with a frame rate of at least 48 frames per second (or at least 60 frames per second, at least 96 frames per second, at least 120 frames per second). Such high frame rates may be used to more precisely track the micro-movements.

In some embodiments, the recording may be made with a camera sensor, e.g. the recording may comprise two-dimensional image data of the face of the user. The visual sensor may comprise or correspond to a camera sensor. Additionally, or alternatively, depth-image data may be recorded, e.g. to enable a more precise tracking of the micro-movements. Accordingly, the facial gesture may be recorded 120 with a depth image sensor, such as a Time-of-Flight (ToF) sensor or a structured light sensor. The visual sensor may comprise or correspond to the depth-image sensor. Accordingly, a light source may be used to provide modulated light for the depth image sensor. The recording may comprise a depth-image recording of the facial gesture performed by the user.

The method comprises comparing 130 the micro-movements of the user's facial features during the recorded facial gesture with the user-specific reference sample of micro-movements for the specific facial gesture. In the following, the term "the user's facial features during the recorded facial gesture" is denoted "the user's recorded facial features". Micro-movements are miniscule movements of facial features that occur during a performance of a facial gesture. The micro-movements are small, e.g. smaller than 1 cm, and short, e.g. at most a second (e.g. between one tenth and one twenty-fifth of a second). The micro-movements may be caused by so-called "micro-expressions" of the user. Micro-expressions are involuntary motions in the user's face that are part of the gestures the user performs. The micro-movements of the user's recorded facial features may be compared with stored micro-movements for the specific facial gesture that are specific for a user, e.g. a user that is authorized to use the device or authorized to perform the financial transaction. For example, the user-specific reference sample may correspond to a single user-specific reference sample or a plurality of user-specific reference samples (or short: user-specific reference samples), as there can be several user-specific reference samples. The user-specific reference sample may be specific for an authorized user, e.g. a user that is authorized to use the device or authorized to perform the financial transaction. The user-specific reference sample of micro-movements for the specific facial gesture may comprise or be based on previously-recorded recording of the micro-movements for the specific facial gesture as performed by the authorized user. In some embodiments, the user-specific reference sample may comprise a recording of a performance of the specific facial gesture as performed by the authorized user. Alternatively or additionally, the user-specific reference sample may comprise a codified version of the performance of the specific facial gesture as performed by the authorized user, e.g. comprising motion vectors of facial features of the authorized user during the performance of the specific facial gesture. For example, the codified version of the performance of the specific facial gesture as performed by the authorized user may be based on a hashing function that has been performed over the motion vectors of facial features of the authorized user during the performance of the specific facial gesture, e.g. to avoid the reconstruction of the motion vectors based on the codified version.

It is to be noted that the term "during" does not necessarily indicate that the processing or comparison is performed while the user still performs the facial gesture. Instead, the term "during" merely indicates that the micro-movements of the user's recorded facial features are micro-movements that the user has performed while the facial gesture of the user has been recorded.

The micro-movements of the user's recorded facial features are compared with the user-specific reference sample. To be able to compare the micro-movements, the method may comprise extracting the micro-movements of the user's recorded facial features from the recording, e.g. to obtain a codified version of the user's recorded facial features. For example, the method may comprise determining a plurality of motion vectors of the user's recorded facial features. To track the facial features, the method may comprise detecting the user's facial features in the recording, e.g. by identifying specific points (corresponding to the facial features) of the face having a high brightness contrast or depth contrast to adjacent portions of the face, and tracking the specific points over multiple frames of the recording. Based on the tracking of the facial features, the plurality of motion vectors may be determined. To be able to track the motion, further processing may be used, e.g. to increase the size of the motions. For this purpose, Eulerian or Lagrangian motion magnification may be used.

In embodiments, the user-specific reference sample is suitable for the specific facial gesture, i.e. the user-specific reference sample is based on the specific facial gesture. In other words, the micro-movements of the user-specific reference sample occur due to the specific facial gesture, e.g. are caused by the specific facial gesture (as performed by the authorized user). The user-specific reference sample is thus distinctly linked to the specific facial gesture, and might not be applicable to other gestures. It is to be noted that, at least in some embodiments, the comparison of the user's recorded facial features compares the user's recorded facial features to the user-specific reference sample that is based on the specific facial gesture, i.e. not to a general user-specific reference sample that is applicable to more than one specific facial gesture. In other words, the user-specific reference sample may also be gesture-specific, i.e. the user-specific reference sample a user-specific and gesture-specific reference sample.

The method comprises authenticating 150 the user based on a match between the micro-movements of the user's recorded facial features and the user-specific reference sample of micro-movements for the specific facial gesture. The match between the micro-movements of the user's recorded facial features and the user-specific reference sample of micro-movements for the specific facial gesture is based on the comparison between the micro-movements of the user's recorded facial features and the user-specific reference sample of micro-movements for the specific facial gesture. For example, if the comparison between the micro-movements of the user's recorded facial features and the user-specific reference sample of micro-movements for the specific facial gesture indicates a high similarity between micro-movements of the user's recorded facial features and the user-specific reference sample of micro-movements for the specific facial gesture, a match may be determined between the micro-movements of the user's recorded facial features and the user-specific reference sample of micro-movements for the specific facial gesture. For example, the match may be determined if the similarity between the micro-movements of the user's recorded facial features and the user-specific reference sample of micro-movements for the specific facial gesture is above a similarity threshold.

In embodiments, a match between the micro-movements of the user's recorded facial features and the user-specific reference sample may be determined if the user that is being authenticated matches the authorized user and, consequently, the micro-movements of the facial features of the user to be authenticated match the micro-movements of the facial features of the authorized user as stored within the user-specific reference sample. In other words, the user-specific reference sample may be provided by the authorized user. The authentication may be successful if the micro-movements of the user's recorded facial features match the user-specific reference sample of micro-movements for the specific facial gesture provided by the authorized user. Additionally, the specific facial gesture may be selected by the authorized user, i.e. the authorized user may have selected the specific facial gesture and designated the specific facial gesture to be used for authentication.

In some embodiments, only a single specific facial gesture may be used for the comparison and/or the authentication. Alternatively, a plurality of facial gestures may be used. For example, the specific facial gesture may be one of a plurality of predefined user-specific facial gestures. The plurality of predefined user-specific facial gestures may be user-specific, i.e. the plurality of predefined user-specific facial gestures may have been specified/selected by the authorized user. In other words, the authorized user may have designated the plurality of predefined user-specific facial gestures to be used for authentication. The user may be authenticated 150 based on a match between the micro-movements of the user's recorded facial features and a user-specific reference sample of micro-movements of a plurality of user-specific reference samples for the plurality of predefined user-specific facial gestures. For example each user-specific reference sample of the plurality of user-specific reference sample may be based on (i.e. associated with, valid for) a (single) specific facial gesture of the plurality of predefined user-specific facial gestures (and vice versa).

In some embodiments, each of the plurality of predefined user-specific facial gestures may be equivalently used for authentication, i.e. each of the plurality of predefined user-specific facial gestures may be used for authentication towards any service the user may peruse after authentication. Alternatively, each specific facial gesture might only be valid for a (single) service, e.g. different services may require different facial gestures. For example, each facial gesture of the plurality of predefined user-specific facial gestures may be associated with a (single) service. Furthermore, each service may be associated with a single facial gesture of the plurality of predefined user-specific facial gestures. The user may be authenticated 150 to use the service in case there is a match between the micro-movements of the user's recorded facial features and a user-specific reference sample of micro-movements of the plurality of user-specific reference samples being associated with the service. In other words, the user may be authenticated 150 to use the service in case there is a match between the micro-movements of the user's recorded facial features and a user-specific reference sample of micro-movements, and if the user-specific reference sample of micro-movements is associated with the service.

In general, the micro-movement-based authentication of the user may be used as a stand-alone feature, i.e. the authentication of the user that is based on the match between the micro-movements of the user's recorded facial features and the user-specific reference sample of micro-movements for the specific facial gesture may be used as a sole factor in the authentication of the user. More specifically, the authentication of the user that is based on the match between the micro-movements of the user's recorded facial features and the user-specific reference sample of micro-movements for the specific facial gesture may be used without requiring an additional face recognition of the user. In other words, the user may be authenticated 150 without requiring an additional still-image-based facial recognition of the user.

Alternatively, the micro-movement-based authentication of the user may be used as a second factor in addition to other biometric or non-biometric authentication factor, e.g. in addition to a fingerprint reader-based authentication, in addition to a face-recognition-based authentication, in addition to a voice-print-based authentication or in addition to a pin- or password-based authentication. More specifically, the authentication of the user that is based on the match between the micro-movements of the user's recorded facial features and the user-specific reference sample of micro-movements for the specific facial gesture may be used in addition to other biometric or non-biometric authentication factors. One biometric authentication factor that may be used in addition to the micro-movement-based authentication of the user is a face-recognition-based authentication of the user, as it is also based on a recording of the face of the user. Consequently, the method may comprise recording 140 a still image of a face of the user. For example, the still image of the face of the user may be recorded in addition to the recording of the facial gesture performed by the user. Alternatively, the recording of the facial gesture performed by the user may comprise the still image. The method may further comprise performing 145 a face recognition based on the still image of the face of the user. The authentication 150 may be further based on a result of the face recognition. In other words, the face recognition may be used as a second factor in the authentication of the user (the first factor being the match between the micro-movements of the user's facial features during the recorded facial gesture and the user-specific reference sample). For example, the authentication of the user may be successful if both the face recognition is successful and if there is a match between the micro-movements of the user's recorded facial features and the user-specific reference sample of micro-movements for the specific facial gesture.

In embodiments the processing circuitry 16 may be implemented using one or more processing units, one or more processing devices, any means for processing, such as a processor, a computer or a programmable hardware component being operable with accordingly adapted software. In other words, the described function of the processing circuitry 16 may as well be implemented in software, which is then executed on one or more programmable hardware components. Such hardware components may comprise a general purpose processor, a Digital Signal Processor (DSP), a micro-controller, etc.

Embodiments of the present disclosure relate to a biometric technique based on micro-movements of the face.

In embodiments, a user wants to be authenticated using a device that includes a camera (e.g. a visual sensor) pointing to the face. The most common solution is face biometrics which is based only on a photo of the face. However, this solution is a static biometric technique that does not take into account the richness of facial expressions. At least some embodiments therefore provide a multi-modal frictionless authentication.

To perform the authentication, during the authentication, the user is asked to perform a predefined gesture with the face. For example, the predefined gesture may be "smiling", "raising eyebrows" etc. Although these gestures are quite common, each user performs these facial gestures in a different way. More specifically, the facial micro-movements produced while performing these gestures are most often user dependent. Since each user performs these face gestures in a different way, this enables a conversion face biometrics, which is usually based only on static images, into a behavioral biometric technique. These facial gestures could last less than a second but they involve many movements of facial muscles. Therefore, these micro-movements produced while performing the gesture could be used to authenticate the user. In many cases, these micro-movements are a part of what is called micro-expressions. Micro-expressions are brief and involuntary facial expressions. They are difficult to mimic because they last $\frac{1}{15}$ to $\frac{1}{25}$ of a second. Usually, they have been used to discover hidden emotions. They are thought of as being user dependent. Such micro-movements may be captured using a normal camera, but a high frame rate may be used to reach a higher accuracy.

This biometric technique is behavioral which makes it more difficult to spoof, since it requires to reproduce the facial gesture in the same way. Furthermore, this biometric technique may be implemented in any device with a camera pointing to the face. The device should have a camera pointing to the face of the user. For example, such a device may be one of a smartphone, a tablet, a laptop, a video game console, a television etc. In some embodiments, the camera may have a high frame rate. The user may be asked to perform a facial gesture during the authentication.

Figure 2:
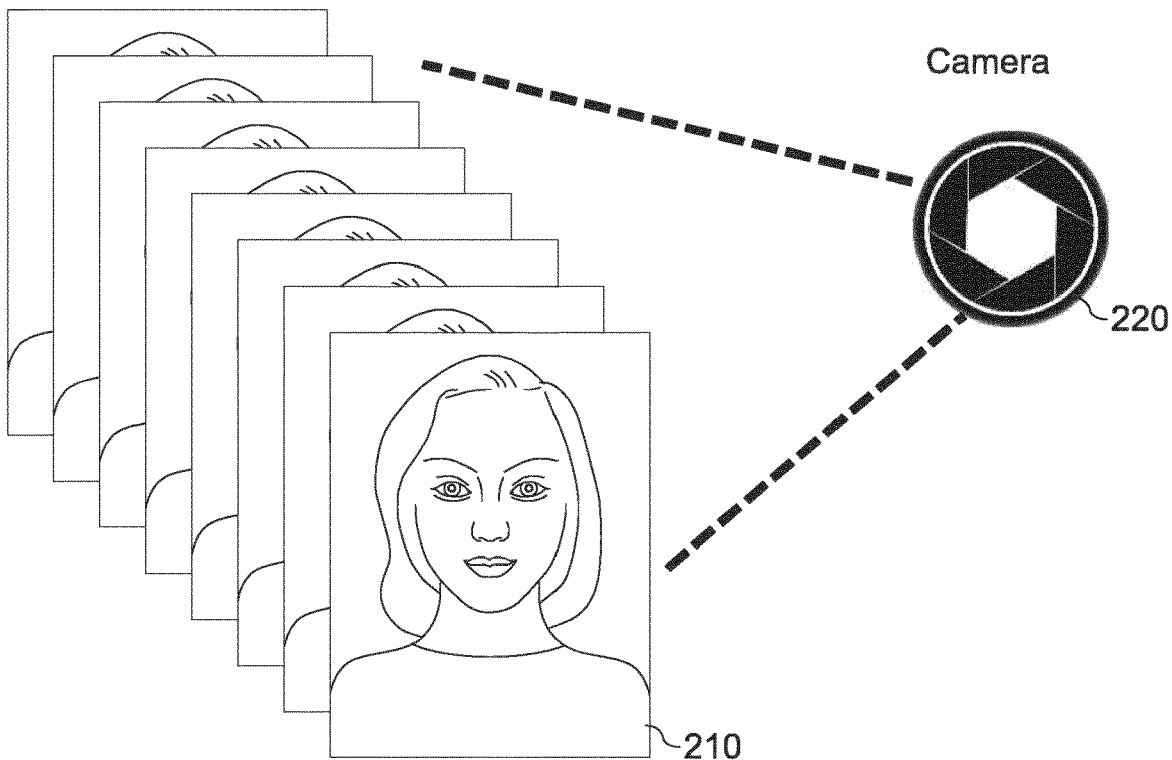
FIG. 2 shows a schematic diagram of a user authentication according to an embodiment.

FIG. 2 shows a schematic diagram of a user authentication according to an embodiment. To perform the authentication, the user 210 is asked to smile to take a selfie/photo. A camera 220 (e.g. a slow-motion camera) may be used to record the process of the smile (i.e. the micro-movements of the user's recorded facial features) using multiple frames. The micro-expressions of the smile may be used as a biometric feature. Since the user has to perform an action, it includes live detection. Embodiments may thus provide a biometric technique based on micro-expressions of the face.

More details and aspects of the biometric technique based on micro-movements of the face are mentioned in connection with the proposed concept or one or more examples described above (e.g. FIG. 1*a* to 1*c*). The biometric technique based on micro-movements of the face may comprise one or more additional optional features corresponding to one or more aspects of the proposed concept or one or more examples described above or below.

The following examples pertain to further embodiments:
(1) A method for authenticating a user, the method comprising:
  Prompting the user to perform a facial gesture;
  Recording a facial gesture performed by the user using a visual sensor;
  Comparing micro-movements of the user's facial features during the recorded facial gesture with a user-specific reference sample of micro-movements for a specific facial gesture; and Authenticating the user based on a match between the micro-movements of the user's facial features during the recorded facial gesture and the user-specific reference sample of micro-movements for the specific facial gesture.

(2) The method according to (1), wherein recording the facial gesture comprises recording a plurality of image frames while the user performs the facial gesture.

(3) The method according to one of (1) or (2), wherein the facial gesture is recorded with a frame rate of at least (6)0 frames per second.

(4) The method according to one of (1) to (3), wherein the facial gesture is recorded with a depth image sensor, the recording comprising a depth-image recording of the facial gesture performed by the user.

(5) The method according to one of (1) to (4), comprising recording a still image of a face of the user and performing a face recognition based on the still image of the face of the user, the authentication being based on a result of the face recognition.

(6) The method according to one of (1) to (5), wherein the user is authenticated without requiring an additional still-image-based facial recognition of the user.

(7) The method according to one of (1) to (6), wherein the specific facial gesture is one of a plurality of predefined user-specific facial gestures, the user being authenticated based on a match between the micro-movements of the user's facial features during the recorded facial gesture and a user-specific reference sample of micro-movements of a plurality of user-specific reference samples for the plurality of predefined user-specific facial gestures.

(8) The method according to (7), wherein each gesture of the plurality of predefined user-specific facial gestures is associated with a service, the user being authenticated to use the service in case there is a match between the micro-movements of the user's facial features during the recorded facial gesture and a user-specific reference sample of micro-movements of the plurality of user-specific reference samples being associated with the service.

(9) The method according to (8), wherein the user is prompted to perform the gesture by providing an indication of the service, the authentication being based on the user's knowledge of which specific facial gesture to use for the service.

(10) The method according to one of (1) to (9), wherein the user is prompted to perform the gesture by providing a description of the specific facial gesture.

(11) The method according to one of (1) to (10), wherein the authentication is based on the user's knowledge of which specific facial gesture to use for the authentication.

(12) The method according to one of (1) to (11), wherein the user-specific reference sample is provided by an authorized user, the authentication being successful if the micro-movements of the user's facial features during the recorded facial gesture match the user-specific reference sample of micro-movements for the specific facial gesture provided by the authorized user.

(13) The method according to (12), wherein the specific facial gesture is selected by the authorized user.

(14) The method according to one of (1) to (13), wherein the specific facial gesture is a posed facial gesture.

(15) The method according to one of (1) to (14), wherein the user is authenticated towards a device, the device being one of a mobile device, a smartphone, a tablet computer, a wearable device, a television, a video game console, a computer, a laptop computer, a desktop computer, a home security system and an automated teller machine.

(16) The method according to one of (1) to (15), wherein the user is authenticated to authorize a financial transaction.

(17) A computer program having a program code for performing the method according to one of (1) to (16), when the computer program is executed on a computer, a processor, or a programmable hardware component.

(18) An apparatus for authenticating a user, the apparatus comprising:
a user interface for providing information to the user;
a visual sensor for recording a face of the user; and
processing circuitry configured to:
Prompt the user to perform a facial gesture via the user interface,
Record a facial gesture performed by the user using the visual sensor,
Compare micro-movements of the user's facial features during the recorded facial gesture with a user-specific reference sample of micro-movements for a specific facial gesture, and
Authenticate the user based on a match between the micro-movements of the user's facial features during the recorded facial gesture and the user-specific reference sample of micro-movements for the specific facial gesture.

(19) The apparatus according to (18), wherein a plurality of image frames are recorded while the user performs the facial gesture.

(20) The apparatus according to one of (18) or (19), wherein the facial gesture is recorded with a frame rate of at least (6)0 frames per second.

(21) The apparatus according to one of (18) to (20), wherein the facial gesture is recorded with a depth image sensor, the visual sensor (14) comprising the depth image sensor, the recording comprising a depth-image recording of the facial gesture performed by the user.

(22) The apparatus according to one of (18) to (21), wherein the processing circuitry is configured to record a still image of a face of the user using the visual sensor and to perform a face recognition based on the still image of the face of the user, the authentication being based on a result of the face recognition.

(23) The apparatus according to one of (18) to (22), wherein the processing circuitry is configured to authenticate the user without requiring an additional still-image-based facial recognition of the user.

(24) The apparatus according to one of (18) to (23), wherein the specific facial gesture is one of a plurality of predefined user-specific facial gestures, wherein the processing circuitry is configured to authenticate the user based on a match between the micro-movements of the user's facial features during the recorded facial gesture and a user-specific reference sample of micro-movements of a plurality of user-specific reference samples for the plurality of predefined user-specific facial gestures.

(25) The apparatus according to (24), wherein each gesture of the plurality of predefined user-specific facial gestures is associated with a service, wherein the processing circuitry is configure to authenticate the user to use the service in case there is a match between the micro-movements of the user's facial features during the recorded facial gesture and a user-specific reference sample of micro-movements of the plurality of user-specific reference samples being associated with the service.

(26) The apparatus according to one of (24) or (25), wherein the processing circuitry (160) is configured to prompt the user to perform the gesture by providing an indication of the service via the user interface, the authentication being based on the user's knowledge of which specific facial gesture to use for the service.

(27) The apparatus according to one of (18) to (26), wherein the processing circuitry is configured to prompt the user to perform the gesture by providing a description of the specific facial gesture via the user interface.

(28) The apparatus according to one of (18) to (27), wherein the authentication is based on the user's knowledge of which specific facial gesture to use for the authentication.

(29) The apparatus according to one of (18) to (28), wherein the user-specific reference sample is provided by an authorized user, the authentication being successful if the micro-movements of the user's facial features during the recorded facial gesture match the user-specific reference sample of micro-movements for the specific facial gesture provided by the authorized user.

(30) The apparatus according to (29), wherein the specific facial gesture is selected by the authorized user.

(31) The apparatus according to one of (18) to (30), wherein the specific facial gesture is a posed facial gesture.

(32) The apparatus according to one of (18) to (31), wherein the user is authenticated towards a device, the device being one of a mobile device, a smartphone, a tablet computer, a wearable device, a television, a video game console, a computer, a laptop computer, a desktop computer, a home security system and an automated teller machine.

(33) The apparatus according to one of (18) to (32), wherein the user is authenticated to authorize a financial transaction.

(34) A mobile device comprising the apparatus according to one of (18) to (33).

(35) A television comprising the apparatus according to one of (18) to (33).

(36) A video game console comprising the apparatus according to one of (18) to (33)

(37) A personal computer comprising the apparatus according to one of (18) to (33).

(38) A home security system comprising the apparatus according to one of (18) to (33).

(39) An automated teller machine comprising the apparatus according to one of (18) to (33).

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for authenticating a user, the method comprising:
   prompting the user to perform a facial gesture;
   recording a facial gesture performed by the user using a visual sensor;
   identifying specific facial feature points based on brightness contrast relative to adjacent portions of a face;
   tracking the identified specific facial feature points over multiple frames of the recording to generate a plurality of motion vectors;
   tracking micro-movements based on the plurality of motion vectors of the user's facial features across multiple frames of the recording;
   comparing the micro-movements of the user's facial features during the recorded facial gesture with a user-specific reference sample of micro-movements for a specific facial gesture; and
   authenticating the user based on a match between the micro-movements of the user's facial features during the recorded facial gesture and the user-specific reference sample of micro-movements for the specific facial gesture, wherein the user is authenticated without requiring an additional still-image-based facial recognition of the user,
   wherein the facial gesture is one of one or more predefined user-specific facial gestures,
   wherein each facial gesture of the one or more predefined user-specific facial gestures is respectively associated with a service, and
   wherein the user is prompted to perform an unspecified facial gesture by providing an indication of the service, the authentication being based on the user's knowledge of which specific facial gesture to use for the service,
   wherein there is a one-to-one relationship between each predefined user-specific facial gesture and each service, such that each service is associated with only one predefined user-specific facial gesture.

2. The method according to claim 1, wherein recording the facial gesture comprises recording a plurality of image frames while the user performs the facial gesture.

3. The method according to claim 1, wherein the facial gesture is recorded with a frame rate of at least 60 frames per second.

4. The method according to claim 1, wherein the facial gesture is recorded with a depth image sensor, the recording comprising a depth-image recording of the facial gesture performed by the user.

5. The method according to claim 1, comprising recording a still image of a face of the user and performing a face recognition based on the still image of the face of the user, the authentication being based on a result of the face recognition.

6. The method according to claim 1, wherein the user-specific reference sample is provided by an authorized user, the authentication being successful if the micro-movements of the user's facial features during the recorded facial gesture match the user-specific reference sample of micro-movements for the specific facial gesture provided by the authorized user.

7. The method according to claim 6, wherein the specific facial gesture is selected by the authorized user.

8. The method according to claim 1, wherein the user is authenticated towards a device, the device being one of a mobile device, a smartphone, a tablet computer, a wearable device, a television, a video game console, a computer, a laptop computer, a desktop computer, a home security system and an automated teller machine.

9. The method according to claim 1, wherein the user is authenticated to authorize a financial transaction.

10. A non-transitory computer-readable storage medium storing computer-readable instructions thereon which, when executed on a computer, a processor, or a programmable hardware component, perform the method according to claim 1.

11. An apparatus for authenticating a user, the apparatus comprising:
   a user interface for providing information to the user;
   a visual sensor for recording a face of the user; and
   processing circuitry configured to:
      prompt the user to perform a facial gesture via the user interface,
      record a facial gesture performed by the user using the visual sensor,
      identify specific facial feature points based on brightness contrast relative to adjacent portions of a face,
      track the identified specific facial feature points over multiple frames of the recording to generate a plurality of motion vectors,
      track micro-movements based on the plurality of motion vectors of the user's facial features across multiple frames of the recording,
      compare the micro-movements of the user's facial features during the recorded facial gesture with a user-specific reference sample of micro-movements for a specific facial gesture,
      authenticate the user based on a match between the micro-movements of the user's facial features during the recorded facial gesture and the user-specific reference sample of micro-movements for the specific facial gesture, wherein the user is authenticated without requiring an additional still-image-based facial recognition of the user,
      wherein the facial gesture is one of one or more predefined user-specific facial gestures,
      wherein each facial gesture of the one or more predefined user-specific facial gestures is respectively associated with a service, and
      prompt the user to perform an unspecified facial gesture by providing an indication of the service, the authentication being based on the user's knowledge of which specific facial gesture to use for the service, wherein there is a one-to-one relationship between each predefined user-specific facial gesture and each service, such that each service is associated with only one predefined user-specific facial gesture.

12. A mobile device comprising the apparatus according to claim 11.

13. A television comprising the apparatus according to claim 11.

14. A video game console comprising the apparatus according to claim 11.

* * * * *